United States Patent [19]

Hennige

[11] Patent Number: 5,276,311
[45] Date of Patent: Jan. 4, 1994

[54] METHOD AND DEVICE FOR SIMPLIFYING THE USE OF A PLURALITY OF CREDIT CARDS, OR THE LIKE

[76] Inventor: Hartmut Hennige, 23 Packman Lane, Home Green Kirk Ella, Hull HU10 7TH N. Humberside, Great Britain

[21] Appl. No.: 908,869

[22] Filed: Jul. 1, 1992

Related U.S. Application Data

[63] Continuation of Ser. No. 485,575, Feb. 27, 1990, abandoned.

[30] Foreign Application Priority Data

Mar. 1, 1989 [DE] Fed. Rep. of Germany ....... 3906349

[51] Int. Cl.5 ..................... G06K 19/00; G06K 19/07
[52] U.S. Cl. .................................. 235/380; 235/492; 902/5
[58] Field of Search ............... 235/380, 492, 379, 382; 902/3, 5

[56] References Cited

U.S. PATENT DOCUMENTS

| | | | |
|---|---|---|---|
| 4,443,027 | 4/1984 | McNeely et al. | 235/487 X |
| 4,667,087 | 5/1987 | Quintana | 902/5 X |
| 4,683,372 | 7/1987 | Matsumoto | 235/492 |
| 4,700,055 | 10/1987 | Kashkashian, Jr. | 235/380 |
| 4,736,094 | 4/1988 | Yoshida | 235/380 X |
| 4,742,215 | 5/1988 | Daughters et al. | 235/487 |
| 4,764,666 | 8/1988 | Bergeron | 235/380 |
| 4,797,542 | 1/1989 | Hara | 235/380 |
| 4,827,111 | 5/1989 | Kondo | 235/380 |
| 4,859,837 | 8/1989 | Halpern | 235/492 |
| 4,879,747 | 11/1989 | Leighton et al. | 235/380 X |

FOREIGN PATENT DOCUMENTS

| | | |
|---|---|---|
| 0197535 | 10/1986 | European Pat. Off. . |
| 2749018 | 5/1978 | Fed. Rep. of Germany . |
| 3041393 | 6/1982 | Fed. Rep. of Germany . |
| 8902387 | 7/1989 | Fed. Rep. of Germany . |
| 2603404 | 3/1988 | France . |
| 2201125 | 8/1988 | United Kingdom . |

*Primary Examiner*—John Shepperd
*Attorney, Agent, or Firm*—Darby & Darby

[57] ABSTRACT

In connection with a system for simplifying the use of a plurality of credit cards, check cards, customer cards, or the like, it is proposed to provide an electronic multi-function card comprising a storage accommodating a plurality of individual data sets representing individual single-purpose cards, and comprising at least two display boxes in which data can be displayed by electronic activation, and further contact means accessible from the outside which enable the data sets stored at any time to be paged through successively and the individual data of each single-purpose card to be displayed in the display boxes, and permitting further the entry of a secret code and, finally, the data sets and/or individual parts thereof to be entered and read out, respectively.

44 Claims, 4 Drawing Sheets

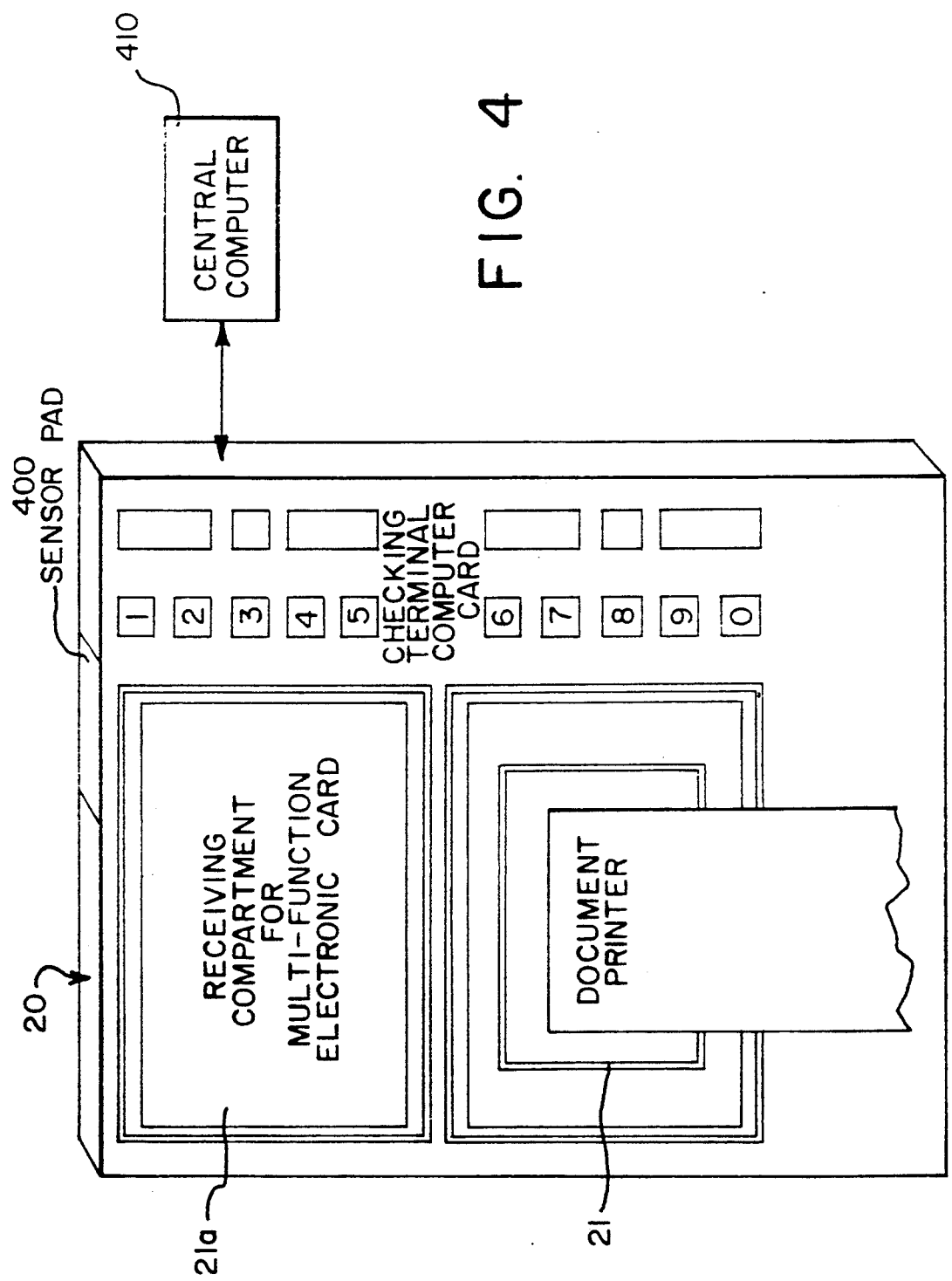

METHOD AND DEVICE FOR SIMPLIFYING THE USE OF A PLURALITY OF CREDIT CARDS, OR THE LIKE

This is a continuation of application Ser. No. 485,575, filed Feb. 27, 1990, now abandoned.

BACKGROUND OF THE INVENTION

Credit cards have been in use in the most different forms and have largely proven their value and found acceptance in cashless purchasing, but also for other purposes, in the form of the usual credit cards, check cards, customer cards. They are about to be introduced in practically all countries worldwide and to become available also to private consumers in ever increasing numbers and diversity.

Such cards, which normally have standardized dimensions, may be offered for different purposes, for example as single-purpose cards for customers and consumers, in which case they would normally fulfill a single function, for example in connection with the operation of rented cars, the handling of banking business, the payment of traveling expenses, as telephone cards, gasoline station service cards, restaurant and department-store cards, or the like. Quite apart from the fact that there are a great number of different credit cards which, as is generally known, are issued by different parties (American Express, Visa, Diners Club, etc.), there also exist a plurality of special or single-purpose cards so that it is by no means rare for a user or user group, for example in countries where such cards have been in use already for an extended period of time, such as the United States of America or England, to possess a quite considerable number of such cards. In the United States, for example, the average citizen owns more than 16 cards, while in Great Britain the average citizen has available 8 cards. And there remains a considerable growth potential for the future, not only in these countries, but worldwide.

This presents certain problems—not only for reasons of convenience, as in many cases the user indeed needs, and has to carry about, a larger number of such cards—but may in fact also create certain safety problems for, if someone carries about a larger number of such cards, which in addition carry the holder's signature in clearly readable form, there obviously exists a risk of loss or forgery. In fact, the cards in use today can be forged relatively easily so that the losses already resulting from the use of forged cards or the fraudulent use of such cards, are already extremely high and are even expected to rise considerably in the future.

Consequently, the problematic situation that one either has to carry about constantly a plurality of such cards or will inevitably find, at the most inconvenient of all times, that the one card needed at the moment has been left at home, is even aggravated by the steadily growing risk of loss or abusive use of such cards.

Now, it is the object of the present invention to remedy this situation and to ensure that, while maintaining the possibility to own and use a practically unlimited plurality of cards or identification cards issued by diverse institutes, companies, authorities, or the like, the user only needs, and is required to carry about, a single card whose safety features are as high as to guarantee that there will not exist any risk of abusive use or forgery in case of loss and that even if very advanced technological means were employed by a counterfeiter any such abusive use or forgery would still be excluded.

ADVANTAGES OF THE INVENTION

The invention achieves this object regardless of the number of cards a person holds and wishes to use and practically regardless of the form and the specific application of the different cards, including identity cards, or the like, there will be required a single card only, which will be described hereafter as multi-function card, and which is designed in such a way that it is capable of differentiating between an activated and a non-activated, i.e. neutral, state.

The multi-function card is an electronic card or computer card which contains, in electronically stored form, not only the data of one card, but rather data sets of all cards held and used by a given person, it being possible without any problem, by simple external manipulations, to convert the multi-function card into a specific card virtually at the moment when the latter is needed.

This operation is comparatively simple since it is in fact easily possible, technologically, to accommodate even very extensive electronic storages in a card-like very flat housing having at least one or a plurality of display windows. Besides, this has been practiced before in the form of so-called check-card calculators which perform simple calculation tasks and which only have a thickness hardly larger than that of usual checks or credit cards. In addition, such calculators are equipped with liquid crystal displays (display means) for indicating the results of the arithmetic operations.

The possibility to use only a single electronic multi-function card to which the respective user may, if desired, transfer the data of all his other cards as well, either immediately or step by step, so that thereafter he only has to carry with him this one electronic multi-function card, provides the advantage of considerable simplification for the individual user and enormous advantages as regards safety against forgery and, generally, abusive use.

Especially as regards the safety against forgery dual security is provided because, on the one hand, the personal signature of the card holder will be reproduced in visible form from the electronic storage in which it has been stored on the respective display of the card only when the card holder, having entered a secret code, has activated the card and prepared it for the intended use by having selected, i.e. called up the data set of a given institute (credit-card company, or the like). Besides, the personal signature appears advantageously only after the electronic card has been inserted into a special checking terminal at the respective point of use, i.e. in the department store, restaurant, or the like—and has been called up for display after the card holder has entered his secret code. It is then further possible to make a document printer operative simultaneously when the checking terminal is activated, for printing out the invoice, for example, which then has to be signed by the card holder, as already practiced today. This exactly is the moment when the signatures are compared.

In addition to this signature-related safety feature, the secret code also prevents safely any abusive use of the electronic multi-function card. This can be achieved without any problem by the use of known interlocking means which act in such a way that following a predetermined number of attempts to use the card, the card will be blocked for a predetermined time for further trials to find the correct secret code, and if a predetermined number of trials should be exceeded, then the card may then even be rendered unserviceable altogether, for example by the deletion of all data. Moreover, a person who finds a card has no means of knowing, or of ascertaining without knowing the secret code, if the card still contains any data.

So, the invention provides a particularly simple possibility to meet all imaginable wishes and requirements of different users and different applications with only a single electronic multi-function card and under optimum safety conditions.

The features specified in the subclaims allow advantageous further developments and improvements of the invention.

Particular advantages are provided by the simple form of the electronic multi-function card which has the outer dimensions of usual credit or check cards and one or more display windows for displaying predetermined data sets when corresponding keys provided on the multi-function card have been actuated, whereby the multi-function card is converted into a single-purpose card, and which after having been used in this manner, is switched off or will be switched off automatically after a predetermined period of time, whereupon it can be converted without any problem to different single-purpose cards by calling up other data sets, the card reproducing in each case the special information or logo of the issuing company or bank, the card number and the date of expiry, any stored photos or, if desired, other machine-readable data and the user's signature.

In order to protect the stored data sets, the multi-function card is equipped with a small accumulator which may receive a charging surge every time it is used, for example introduced into a checking terminal. Alternatively, or as a supplementary feature, the multi-function card may be operated by solar cells which may then also serve to charge the battery.

BRIEF DESCRIPTION OF THE DRAWING

Certain embodiments of the invention will now be described in more detail with reference to the drawing in which:

FIG. 4 shows a possible embodiment of a checking terminal, preferably combined with a document printer.

DESCRIPTION OF THE EMBODIMENTS

Figure 1A:
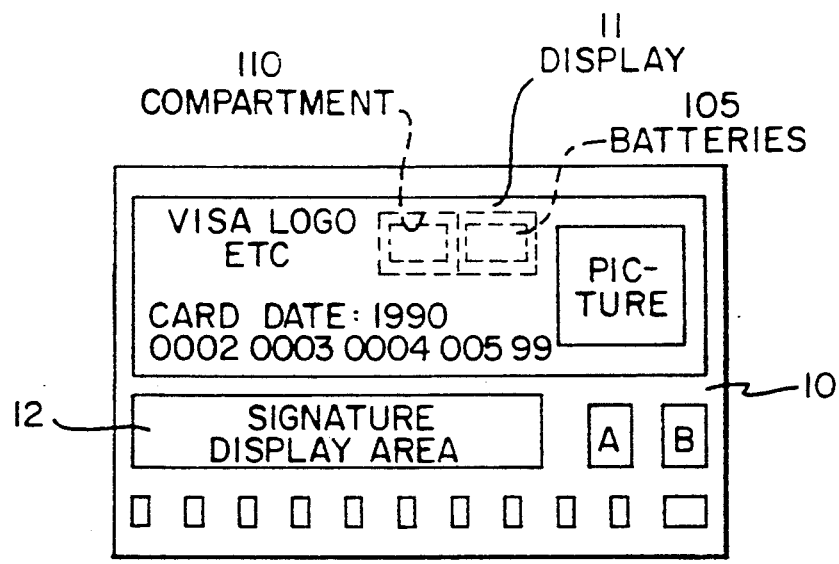
FIG. 1a shows, one possible embodiment of an electronic multi-function card with display windows and (covered) keys

It is the basic idea of the present invention to provide an electronic multi-function card equipped with an electronic memory, which comprises a plurality of data sets transferred from original credit cards, check cards, identity cards, and the like, and which is designed in such a manner than when selected data are input, the free display windows of the multi-function card will always display the data or the data set of a given credit card or check card, or the like, and will be available for the desired use and, insofar, usual application. The user then only needs to carry with him this single multi-function card which, when not activated, is a neutral electronic card and, when activated in a particular way, will display the logo of the issuing institute, the holder's photo, his signature and other relevant data in a visible manner.

Further, such a multi-function card may serve a plurality of additional functions, for example for general identification purposes, as driver's licence, identity card, club card, time-recording card, access control card, filling-station card, and for automated cash handling. All these functions can be handled with the aid of a single electronic multi-function card more safely and more efficiently.

In FIG. 1, an imaginable embodiment of an electronic multi-function card is designated by reference numeral 10. The card comprises a first, for example larger, display 11 and an additional display 12, which are basically suited for displaying any figures, shapes, letters, etc., for example in the usual form of liquid crystal displays, or the like. It goes without saying that such cards may also use any other display means, according to the state of the art given at any time, for example in the form of color representations, for example of photos or logos of the issuing companies, or the like. Such color representations of logos may be very important for a company issuing a card so that color representation may be used for such areas, whereas black-and-white representation may be used for all other data.

In addition, such an electronic multi-function card is equipped with a plurality of input keys 13. Further, separate input keys 14 may be provided for calling up certain special functions.

Figure 1B:
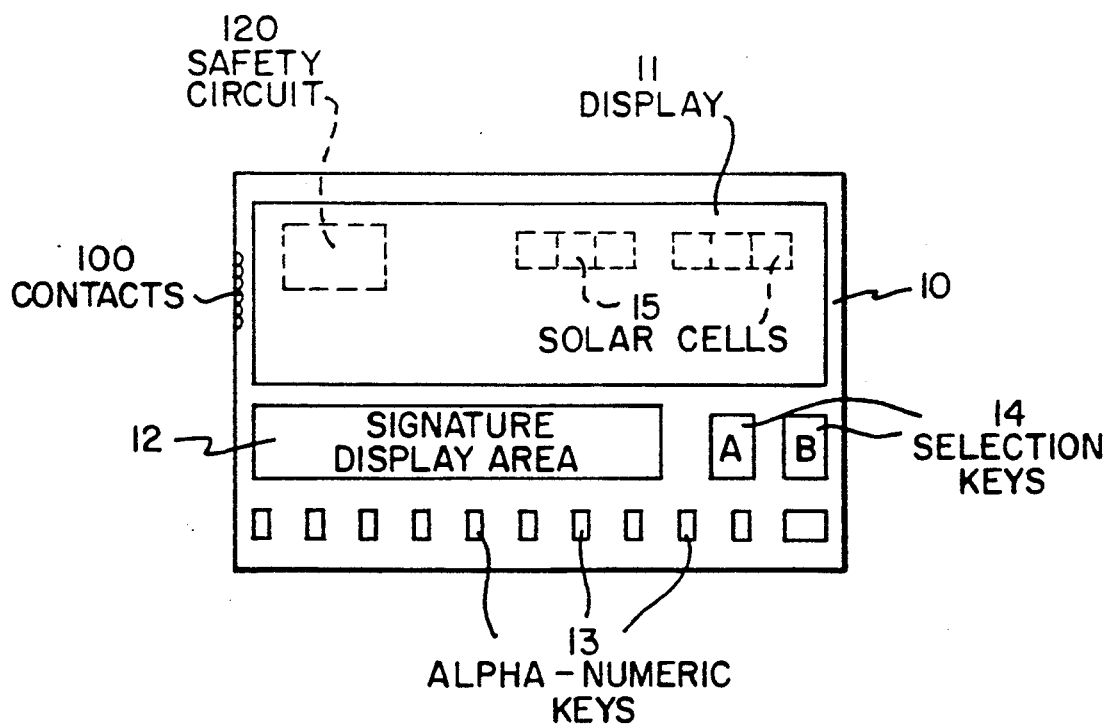
FIG. 1b shows the conversion to a single-purpose card as one of the possibilities resulting from a large number of conveniently stored data sets.

In the non-activated state, which is illustrated in FIG. 1a, such a card may be regarded as a blank page equipped, however, with the usual electronic circuit means which are regarded as standard today, for example microprocessor or computer features, i.e. clock generators and drivers, sequence controls, in particular an electronic storage in a very broad sense, etc. In addition, there may be provided advantageously external mechanical contacts, 100 are shown in FIG. 1b but which may prove very convenient for communication with a checking terminal of the master unit, although it is of course also possible in this connection to input or inquire data by contactless means, for example inductively, or serially by means of photoelectric elements, or the like. It is further understood that at least one electric energy storage must be provided, for example in the form of usual button cells serving as rechargeable batteries 105 placed in compartment 110, and, if desired, also a reserve storage serving the function to protect the data in case a main battery should get exhausted. The batteries may be recharged using solar cells 115.

It is the basic idea underlying the present invention that one can now transfer to such an electronic multi-function card successively the data sets of several separate cards issued by credit institutions, e.g. check cards, customer cards, identity cards, and the like, in which case each data set will occupy a given set of storage positions so that it can be scanned separately by addresses entered externally, for example by operation of given keys in a given succession.

Figure 2:
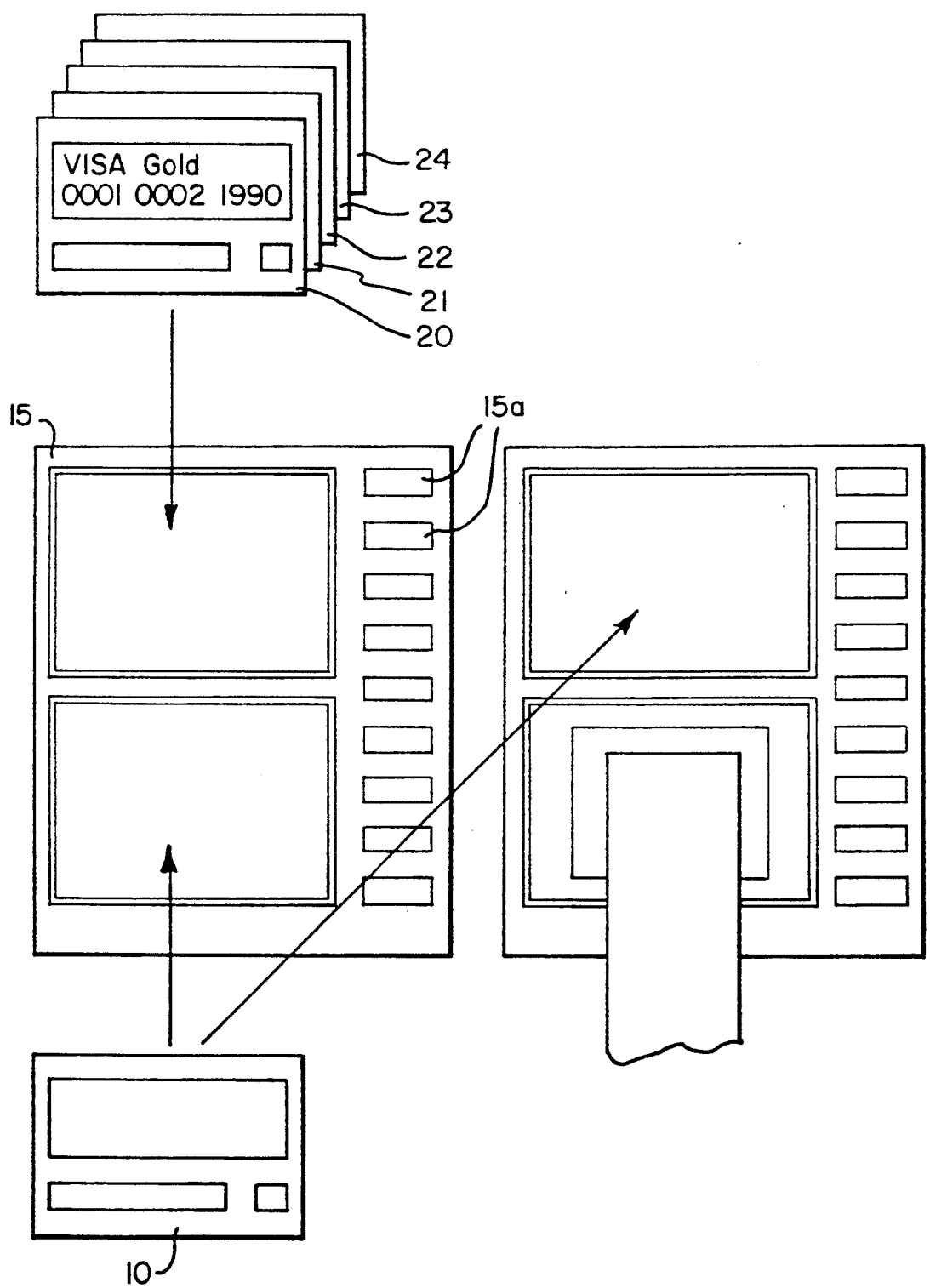
FIG. 2 shows a possible operational flow for transferring the data from a larger number of individual cards of different origins to the multi-function card which is then evaluated using a checking and printing terminal.
Figure 3:
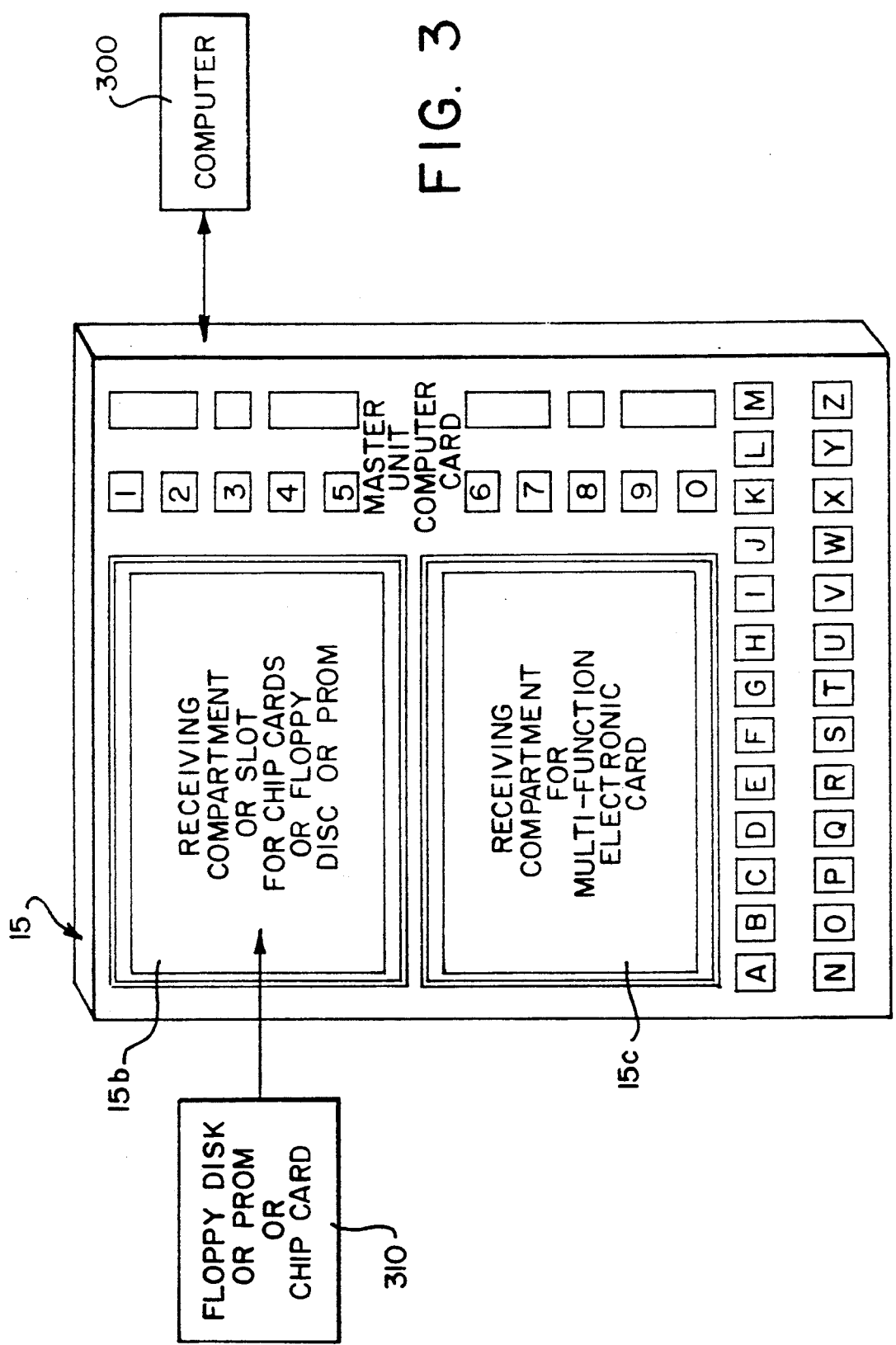
FIG. 3 shows a possible embodiment of a transmission unit (master unit) by means of which the individual data sets of the original single-purpose cards can be transferred to the multi-function card.

One possibility for effecting such a data transfer is the use of a master unit 15 of the type shown in FIG. 3 by which the data are transferred as illustrated in FIG. 2. In FIG. 2, single-purpose cards of a desired, known type, namely credit cards 20, 21, 22 or check cards 23, or identity cards 24, etc. are designed in such a way—in the conventional manner—that a computer chip or another electronic storage including a certain amount of additional electronic circuitry is included in such cards 20, 21, 22 . . . .

In addition to the outer appearance of these cards, this chip then stores all important data of the card, as well as the user's signature, his photo and the logo of the issuing company.

The data so stored may be inquired from the chip so that the user of a multi-function card may introduce all his single-purpose cards 20, 21, 22 . . . one by one into his master unit 15 which, when activated via a keyboard which is accessible from the outside, will inquire the data contained in the computer chip of the individual single-purpose card and transfer them as a data set to the electronic multi-function card, which has been introduced into the master unit as well, or rather to the storage of this card. This first possibility of entering the data into the electronic multi-function card 10 requires that the issuing companies or other institutes issuing check cards, such as banks, companies, authorities, clubs, or the like, have introduced computer chips into their new single-purpose card generation process, a feature which would of course considerably improve the application properties of such cards as well.

There are numerous other possibilities of entering the data into the electronic multi-function card which are both imaginable and possible. For example, it would seem imaginable that the issuing party (this term is used here to describe credit-card companies, banks, authorities, institutes, or the like) may send the user, after completion of the application formalities, a data carrier, 310 in FIG. 3, for example in the form of a floppy disk, a PROM, or the like, depending on the design of the master unit, so that the latter can scan the data carrier and transfer the data to the electronic multi-function card.

It is also imaginable in this connection that the user of the electronic multi-function card must send the latter to the issuing institute or bring his card to an agency for the purpose of loading the necessary data into the storage of the multi-function card.

Besides, the data transfer may be effected by the user in steps until all his cards, which originally may have any desired form, have been transferred to the multi-function card in the form of data sets, whereafter the user only has to carry with him the single electronic multi-function card.

Returning now to the illustration of FIG. 1, one easily recognizes the operating mode of such cards. Once the user has entered his personal secret code, for example via the keys 13, he may call up different single-purpose cards, for example by pressing the keys A and/or B once or several times or by entering a given address. If, for example, key A is pressed the first card to be implemented by a relevant display in display box 11 will be the single-purpose card of a given credit institute, in the present case a "Visa" card, with logo, card data, the user's photo and, if desired, his signature. Preferably, however, the electronic system of the multi-function card is such that the signature will become visible in the display box 12 only in the area of a checking terminal.

It is possible for a user in this way to page through all data sets of the electronic multi-function card 10, as every time the key A is pressed once more, the information, data and logo of the next credit-card company, bank, or the like, will be displayed in the display boxes 11 (and 12). To say it in other words: The multi-function card may, at the user's request, assume the form of a single-purpose card and may then be used for the purpose intended by the holder of the card who is of course a customer of the respective credit-card company or bank.

A keystroke, therefore, induces the multi-function card to display in the one or more data display windows the logo, address, and name of the respective issuing company, maybe also a photo and (later) the signature of the user.

Due to the chips already available and the latest developments in the technological field, extremely high storage capacities are already available so that a practically unlimited number of single-purpose cards can be accommodated and kept available in the multi-function card in the form of data sets.

The application and use of an electronic multi-function card, therefore, is as follows:

First of all, the user procures himself the desired single-purpose cards, if he has not done so before, by entering his relevant data, for example, into a form provided by a bank or a credit-card organization, applying his signature and filing it together with a photo.

After all these data have been verified and accepted by the issuing company, the user is delivered a data carrier which contains all the necessary data in the form of the before-mentioned data set. As described before, this data carrier, 310 in FIG. 3, may either be a normal single-purpose card with an integrated computer chip, or else a PROM, a floppy disk, or the like. The data set in question comprises at least the data of the bank or the issuing party, i.e. the logo, designation or the like, and the data pertaining to the user, such as card number and expiry date, the stored photo and the user's signature.

If the user does not yet own an electronic multi-function card and a corresponding master unit, as shown in FIG. 3, the issuing party may also deliver to the user such a multi-function card together with the master unit. The latter is provided, as illustrated in FIG. 3, with a slot 15b for the computer-chip single-purpose card and a slot 15c for the electronic multi-function card.

For transferring the data from the data carrier, the user, having received a chip card from the issuing party, may insert this card into the slot 15b of his master unit, and the multi-function card into the other slot 15b. By actuating corresponding external keys it is then possible to display and verify the data in the display box of the electronic card.

If everything is in order, the user—and he along—determines a secret code which will be required later to activate the electronic multi-function card. This secret code is known to nobody else but the user and may be input in the electronic multi-function card, for example via the master unit 15. The secret number or, to say it more generally, the secret code, is then generally valid and required to obtain access to the multi-function card, it being understood that individual data sets relating to the different single-purpose cards may either be called up by addressing them directly by means of a code, or paged through—as has been mentioned before—by repeated actuation of predetermined keys.

The secret code is known to the user only and cannot be discovered, at least not by a few trials.

The original data carrier, for example the computer chip card, the PROM or the floppy disk, may then be returned to the issuing party; or if a chip card has been issued as a data carrier, it may be retained by the user and preserved by him in a safe, for example as a replacement card just in case this should be needed.

If the user then wishes to pay an invoice using his card, he has to activate the electronic multi-function card—the only one he has with him—by entering his secret code and to decide thereafter which of the available individual cards is to be used.

He may then page through by keystroke the organizations stored—such as Visa, Diners, Avis, Shell, etc. Finally, the card, with the information including the user's photo now visible, can be presented to the salesperson or the party evaluating the card.

The latter then disposes of a checking terminal which may have a very simple design, just as the master unit. Such a checking terminal is designated by reference numeral 20 in FIG. 4. The electronic multi-function card, with the data displayed thereon, is introduced into the slot 21a. It is only now that the user's signature becomes visible in the display box 12 of FIG. 1. This is a very convenient arrangement.

In order to permit the checking terminal to cooperate with the electronic card, the latter may be provided with small, outwardly projecting contacts, element 100 of FIG. 1a, for example in the marginal area, which may then be contacted mechanically by contacts arranged in the slot of the checking terminal, whereby the latter is enabled to enter the signature-activating code and to inquire the general data of the card organization; or such contact can be established in any other known manner, for example by optical, inductive, capacitive or other suitable means.

Conveniently, there may be provided and connected a document printer 21, so that the checking terminal can generate simultaneously a voucher after the salesperson has input the invoice data into the terminal.

The voucher is then signed by the user in the same manner as practiced today, which simultaneously permits comparison of the signatures. A copy of the voucher is delivered to the user.

The invention permits to implement a plurality of safety aspects which make such an electronic multi-function card considerably better and safer, compared with the credit and bank cards presently in use which can be forged very easily. Another advantage of the electronic multi-function card according to the invention lies in the fact that there is no need for the magnetic stripe normally existing on the present single-purpose cards, which may be damaged easily whereby their data may be deleted fully or in part.

The present invention provides the following safety aspects:

The secret code, which may also be described as PIN code, is selected and entered by the user himself—nobody else but the user knows this code, which may also consist of the usual combinations of figures and letters.

The secret code can be determined only if a master unit according to FIG. 3 is available, as only the master unit is provided with means for entering figures or alphanumerical information, as shown in FIG. 3. Besides, it may be convenient for space reasons to assign several functions to the keys 13, 14 of the electronic multi-function card, which functions may be changed by the actuation of specific keys, for example those indicated by reference numeral 14.

The master unit 15 may be designed, according to FIG. 3, to be serviceable only when an original chip card issued by the issuing party (credit-card organization, bank, or the like) is inserted. Further, the chip contained in this card, or the PROM, may be designed in such a manner that they will remain serviceable only for a limited period of time, which means that these elements may be provided with a so-called date lockout feature which means that the chip card or PROM will become unserviceable after a predetermined period of time.

Further, the chip card may be programmed in such a way that it will operated only once and will be invalidated automatically after the first verification check.

Another safety aspect lies in the fact that the signature and/or the photo of the user are input into the chip of the single-purpose card or into the PROM by the issuing party and become visible only during the first activation process, i.e. during loading of the multi-function card.

A person who has found, or intentionally misappropriated, such an electronic multi-function card has no sample of the signature as he does not know the secret code required for activating the multi-function card.

But even if a person having found or intentionally misappropriated such a card should succeed in getting to know the secret code, for example if he should have observed the activation process on some previous occasion, he still does not know the signature because the multi-function card and the checking terminal are designed in such a way that the signature becomes visible only when the card is inserted into the checking terminal. On the other hand, however, the user is requested to sign his signature whenever he intends to use the card. The signature on the card becomes visible only when the card is inserted into the checking terminal 20, as shown in FIG. 4, and can then be compared with the signature applied by the user.

Another safety aspect of the present invention resides in the fact that a person finding such a card does not even know if the card still contains any data; nor does he know how many and what logos are stored in the card, or what purposes the card is to serve.

In addition, the electronic area of the multi-function card is designed in such a manner that the card will become unserviceable after a given number of unsuccessful attempts to find the correct secret code. This operation is performed by the safety circuit 120 of FIG. 1a.

There is further the possibility to render a multi-function card immediately unserviceable, if this should become necessary, for example by deletion of the full storage content by any checking terminal which is connected on-line to a central computer or which has been programmed appropriately via a "black list".

According to another aspect of the present invention, a user owning a commercially available computer, for example a PC, may adapt this computer 300 in such a way, for example by means of an adapter and corresponding software, that no single-purpose chip card, no PROM, and no master unit of the type shown in FIG. 3 will be needed and that the necessary data sets can be transferred to the multi-function card directly with the aid of the computer, if the issuing party, i.e. the bank or credit-card company, sends the user a usual floppy disk containing the necessary data sets together with the relevant software.

Once the software has been read in, the user will then be told exactly what to do through menus and corresponding operator prompts.

In this case, too, one can then enter the secret code via the computer keyboard and, if desired, erase the data on the floppy disk for safety reasons.

A particularly advantageous implementation of the present invention, regarding the verification of the user's personal signature, is obtained by the use of a method—which as such has been known before—according to which the comparison, instead of being effected by personal inspection, is made mechanically/electronically.

In this case, the user of the multi-function card must sign his signature on a pad 400 in FIG. 4 forming an integral part of the unit so that the terminal and/or its logic computing circuit or computer are capable of picking up the signature and comparing it with a stored sample.

According to an advantageous arrangement, storing and picking-up of the signature at the terminal, as well as the mechanical/electronic comparison, are performed in digitalized form.

This solution provides again two advantageous variants, namely that the stored signature, i.e. the one which is compared mechanically/electronically with the user's signature applied at the very place, may be stored centrally by the party/parties issuing the card so that when verifying the inserted card, for example with respect to the credit rating and other identity features, the computer in the terminal may simultaneously, by an additional step, call up the signature stored in the central unit 410 in FIG. 4 for the respective card, which is then transmitted to the local computer digitally, together with all necessary characteristics.

Once the user then has signed his signature at the terminal, the digital comparison can be effected immediately, it being possible in this case to verify not only the identical appearance of the signatures, but also certain other characteristics which can be recognized in this way, for example the dynamics of the signing process as such—a feature which is not necessarily identical to the signing speed, but may in addition encompass a plurality of characteristics, all described summarily by the term "stored signature".

According to the other variant, the user's signature may, if desired, be stored digitally not only in the central computer 410, but also in the storage of the multi-function card so that in the event the terminal should not be in a position at a given moment to call up the signature stored in the central computer 410 and/or the card should be used in a country where this would anyway be impossible for one reason or other, the local computer may take recourse to the signature stored digitally in the multi-function card, may call up this signature by means of a corresponding secret code directly from the multi-function card, and may then effect the comparison with the personal signature signed at the terminal. In this case, too, the terminal is in a position to verify the identity of the two signatures by a simple "correct" or "error" message.

There may be still other, additional safety features incorporated in this respect. For example, the terminal may permit two or three trials, and if thereafter the signature still does not comply with the stored signature (as called up either from the central computer 410 or from the multi-function card), the whole content of the multi-function card may be deleted, i.e. destroyed.

It goes without saying that the area of the terminal where the signature has to be applied, must be equipped with a suitable pick-up pad 400 with sensors, which may be described, for example, as a multi-sensor pad, and which must be provided with sensors of different grain sizes suitable for recording even very fine details of the signature in order to permit digital recording and processing of the applied signature.

In order to obtain access to the multi-function card, one therefore always needs at least two secret codes, namely on the one hand the PIN code, which is anyway accessible for the user for activation of the card and for paging through the existing cards by means of the at least one display window, and on the other hand the secret code which provides access to the signature and which, usually, can be activated only through the terminal, provided the signature code is stored in the multi-function card and one does not prefer, from the very beginning, to perform the signature comparison absolutely separately from the multi-function card, by calling up the signature, as mentioned before, in digitalized form from the central computer 410 and comparing it with the signature applied at the very place. The terminal computer is of course capable of calling up the signature from the central computer 410 because the inserted multi-function card enables the other data contained in the card to be picked up by the terminal computer and to be used by it for communication with the central computer 410.

The above explanations reveal an additional advantage resulting for the user; for, if a user owns a larger number of individual cards, which may also be secured by specific PIN codes, then the user—in any case the average user—will hardly be able to memorize all PIN codes for the large number of his individual cards so that this safety function will be lost or, in any case, not utilized. On the other hand, any user should be in a position to memorize the single secret code or PIN code required for activating and paging through his single multi-function card.

Consequently, all the features illustrated and described by the specification, the claims and the drawing may be essential to the invention either alone or in any combination thereof.

An additional advantage of this single multi-function card represents its use as key, master key or any other an access to e.g. buildings, cars enabling system or means.

I claim:

1. A method for enabling a user of an electronic multi-function card to select data from a plurality of data sources such as credit cards, check cards, customer cards, identity cards, documents, keys, access information and master keys comprising the steps of:

transferring a data set from each of the plurality of data sources to the multi-function card;

storing said transferred data set from each of the plurality of data sources in the multi-function card;

assigning a secret code to activate the multi-function card;

entering said secret code into the multi-function card to activate the same;

selecting with said activated multi-function card a select one of said data sets; and displaying on the multi-function card in at least one predetermined display area the data of said selected data set.

2. The method according to claim 1 further comprising the steps of storing a personal signature of the user on the multi-function card and verifying the personal signature signed by the user at the moment when he uses the card with said stored personal signature.

3. The method according to claim 2, wherein said step of entering said secret code into the multi-function card comprises selective operation of input keys at the place of use of the multi-function card whereby entering said secret code accesses a select one of said data sources, and further comprises the steps of: inserting the multi-function card into a checking terminal for payment purposes, displaying said stored signature in a predetermined one of said display areas of said multi-function card for visual inspection, producing said personal signature at the moment of payment on a document printer assigned to said checking terminal, and comparing said applied personal signature with said displayed personal signature.

4. The method according to claim 3, wherein the multi-function card further comprises at least one battery, whereby inserting said multi-function card into said checking terminal subjects said at least one battery to a charging surge.

5. The method according to claim 3, wherein the multi-function card further comprises electrical contacts and wherein said checking terminal comprises a slot for receiving said multi-function card and reading and evaluating said data from the inserted multi-function card through said electrical contacts.

6. The method according to claim 3, wherein said checking terminal comprises a slot for receiving said multi-function card and reading the evaluating said data sets from said inserted multi-function card.

7. The method according to claim 3 wherein said step of verifying the personal signature is performed at a checking terminal after inserting said multi-function card into said checking terminal.

8. The method according to claim 2, wherein the step of verifying said stored signature comprises displaying said stored signature in a predetermined display area of the multi-function card for comparison by visual inspection.

9. The method according to claim 8, further comprising the step of inserting the multi-function card into a checking terminal, said checking terminal including a sensor pad, and wherein the step of verifying said stored signature comprises electronically comparing said stored signature with a signature produced on said sensor pad.

10. The method of claim 1, including the further step of verifying proper use of said card by comparing the personal signature of the user with a stored signature.

11. The method according to claim 1 wherein said transferred data set is transferred from a data carrier supplied by an issuing party and said transferred data set is transferred to the multi-function card by introducing said data carrier and the multi-function card into a transmission unit.

12. The method according to claim 11 wherein said data carrier is a credit card having a readable storage for storing said data set, and said data carrier is introduced into said transmission unit by introducing said readable storage into said transmission unit.

13. The method according to claim 12 wherein said readable storage comprises an electronic chip.

14. The method according to claim 12 wherein said readable storage comprises a floppy disk.

15. The method according to claim 12 wherein said readable storage comprises a PROM.

16. The method according to claim 11 wherein said transmission unit comprises a master unit having a first slot for receiving said data carrier and a second slot for receiving the multi-function card, and a keyboard for said step of entering of said secret-code into the multi-function card.

17. The method according to claim 11 wherein the transmission unit comprises a computer having an adapter for receiving said data sets from said data sources, said computer having a keyboard for entering said secret code and said computer being operable to transmit to the multi-functional card said data sets.

18. The method according to claim 17 wherein said checking terminal erases said stored data sets of the multi-function card in response to use of an incorrect secret code of the multi-function card.

19. The method according to claim 1 further comprising the steps of storing a personal signature of the user on a central computer of the party issuing the data source and comparing the personal signature produced by the user with said stored personal signature to verify use of said card.

20. A device for selecting data from a plurality of data sources such as credit cards, check cards, customer cards, identity cards, documents, keys, access information and master keys comprising:
an electronic multi-function card, said card having storage means for storing a data set from each of the plurality of data sources, said card having at least one display area for displaying said stored data set;
input means for producing a secret code;
activating means for activating said card for use;
processing means responsive to said secret code for enabling said activating means;
selection means for selecting a predetermined one of said stored data sets in said activated card; and
display means for displaying said selected data set on the card in said display area.

21. The device according to claim 20, wherein the data sources comprise sources having a readable storage for storing said data set, and a transmission unit having a first slot for receiving the data source and a second slot for receiving said card.

22. The device according to claim 21, wherein the readable storage comprises an electronic chip.

23. The device according to claim 21, wherein the readable storage comprises a floppy disk.

24. The device according to claim 21, wherein the readable storage comprises a PROM.

25. The device according to claim 21, wherein said transmission unit includes keys, said transmission unit transmitting said data sets from the plurality of data sources to said card in response to operation of said keys.

26. The device according to claim 21, wherein said multi-function card further comprises electrical contacts and wherein said checking terminal comprises a slot for receiving said multi-function card, contacts within said slot for mating with said card contacts to connect said checking terminal with said card.

27. The device according to claim 21, wherein said checking terminal comprises a slot for receiving said multi-function card and connecting means for connecting said card with said checking terminal.

28. The device according to claim 27, wherein said contact means comprises light transmitters and light receivers.

29. The device according to claim 27, wherein said contact means comprises a reactive device.

30. The device according to claim 20, wherein said at least one display area comprises a first display area for displaying the name and logo of the data source, a photo of the user of the card and other card data, and a second display area for displaying the signature of the user of the card.

31. The device according to claim 20, wherein the processing means further comprises a safety circuit for blocking the activation of the activating means, said safety circuit being disabled in response to said secret code.

32. The device according to claim 31, wherein said safety circuit includes erasing means operable to erase the data stored in the multi-function card in response to an incorrect entry of said secret code.

33. The device according to claim 20, wherein the multi-function card comprises a first set of keys for activating said selection means, whereby the user sequentially accesses each of said data sets from said plurality of data sources; and a second set of keys for entering the user's secret code.

34. The device according to claim 33, wherein said second set of keys comprise alpha-numeric keys.

35. The device according to claim 20, wherein the multi-function card further comprises a signature storage means for storing a personal signature of the user in the multi-functional card.

36. The device according to claim 35, wherein said processing means further comprise a checking terminal and wherein said display means is responsive to said checking terminal for displaying said stored signature on said card in one of said display areas.

37. The device according to claim 36, wherein said checking terminal is operable to produce a second secret code, and said activating means is responsive to said second secret code from said checking terminal to display said stored signature in one of said display areas.

38. The device according to claim 36, wherein said checking terminal comprises a document printer for receiving the signature of the user.

39. The device according to claim 36, wherein said multi-function card further comprises at least one battery and wherein said checking terminal further comprises charging means for charging said battery every time said multi-function card is inserted into said checking terminal.

40. The device according to claim 20, wherein said display means comprise a color display and selected data sets are displayed in said display areas in color.

41. The device according to claim 20, wherein the multi-function card includes at least one rechargeable battery.

42. The device according to claim 41, wherein said multi-function card includes at least two batteries, one of said batteries being operable to power said multi-function card when the other of said batteries falls below a predetermined power level.

43. The device according to claim 20, wherein the multi-function card further comprises solar cells for powering said multi-function card.

44. The device according to claim 41, wherein the multi-function card further comprises a solar circuit for charging said battery.

* * * * *